G. W. BEAL.
GATE FOR STOPPING RUNAWAY ANIMALS.
APPLICATION FILED JULY 5, 1910.
992,329.
Patented May 16, 1911.
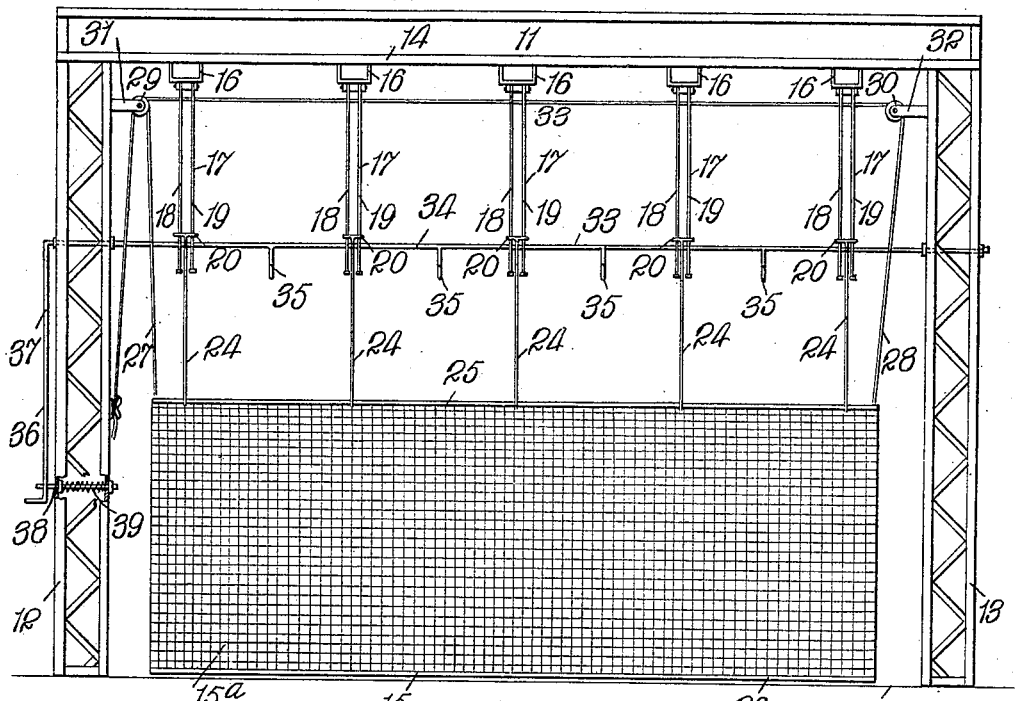
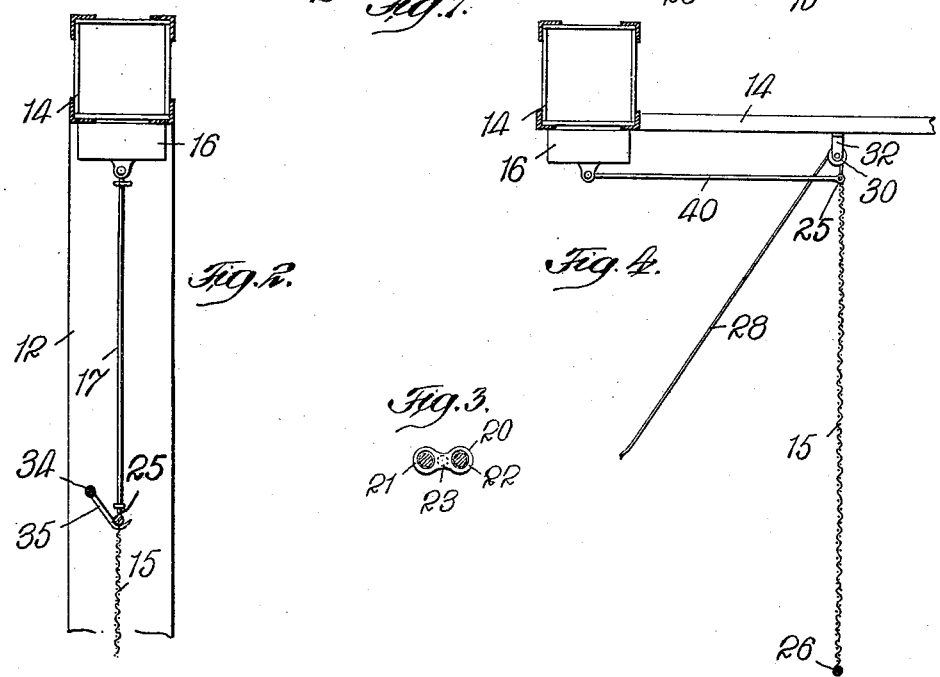

UNITED STATES PATENT OFFICE.

GEORGE W. BEAL, OF NEW YORK, N. Y.

GATE FOR STOPPING RUNAWAY ANIMALS.

992,329. Specification of Letters Patent. Patented May 16, 1911.

Application filed July 5, 1910. Serial No. 570,438.

*To all whom it may concern:*

Be it known that I, GEORGE W. BEAL, a citizen of the United States, and a resident of New York, county and State of New York, have invented certain new and useful Improvements in Gates for Stopping Runaway Animals, of which the following is a full, clear, and exact specification.

This invention relates more particularly to a device or an emergency gate adapted for use upon highways to stop runaway horses or cows and the like.

My invention has for its main object to provide a gate or device which may be constructed across bridges, roads or other highways traveled by horses, cows and other animals, and which is adapted to be used in emergency for stopping the runaway animal.

Another object of the invention is to provide a form of gate which will not injure the animal in obstructing its course of excited travel, and which may be erected so as not to be an obstacle in the progress of the regular travel of teams and other vehicles over the highway.

Still another object of the invention is to provide an arch or trestle which may be erected across and above a highway for effectually supporting the gate in a suspended position, and to provide means adapted to retain the gate when raised clear of the highway.

A further object of the invention is to provide efficient means for operating the retaining means whereby the gate may be readily released in cases of emergency and lowered in front of the animal across its course of runaway travel.

A practical embodiment of the invention is represented in the accompanying drawing forming a part of this specification, in which similar characters of reference indicate corresponding parts in all the views, the said invention being more fully described hereinafter and then pointed out in the appended claims.

In the drawing, Figure 1 is a front elevation of one form of my invention showing the manner of erecting the same across the driveway of a bridge, road, or the like. Fig. 2 is a view taken vertically of the central part of Fig. 1 showing the retaining means for holding the gate suspended above the highway. Fig. 3 is a top plan of one of the slides held upon one of the guides supporting the gate proper. Fig. 4 is an end view of the arch showing another form of means for raising and suspending my gate above the surface of a highway.

At any desired locality of the driveway, as 10, of a bridge, road or other highway may be constructed the arch or trestle 11 which includes preferably two pillars 12 and 13 erected to a suitable height above the surface of the driveway, and upon the upper ends of said pillars is supported a beam 14 extending across said driveway, all of which may be of any suitable material and constructed in any preferred form.

The gate 15 which forms mainly the means of my invention for stopping a runaway animal is arranged so as to be disposed longitudinally crosswise of the driveway, and is of a proportion to embrace practically the entire lower space between the pillars 12 and 13 so that the approaching runaway animal cannot avoid contacting with the gate. As shown the gate 15 is substantially rectangular in shape, and has a body made preferably of plaited or intertwined rope or other pliable material, in the form of a net, as 15$^a$, which will serve as an efficient obstruction at the same time will not injure the animal.

Upon the underside of the cross-beam are provided a plurality of brackets or angle irons 16 to each of which is connected in any desired manner a guide 17. Each of the guides 17 is formed of two arms 18 and 19 arranged in parallel relation and disposed vertically downward, and adapted to be movably held upon each of the guides 17 is a slide 20 formed of two rings or eyes 21 and 22 which are spaced apart by a bridge 23, as illustrated in Fig. 3. Centrally of each of the bridges 23 is held one end of a depending rod or cable 24, and to the opposed end of said cable is connected the cross frame 25 provided upon the upper longitudinal edge of the gate 15. Upon the lower longitudinal edge of the gate 15 is held a frame 26 which is of sufficient weight to hold the netting 15$^a$ taut or properly stretched, as illustrated in Fig. 1 of the drawing, which shows the gate 15 lowered and positioned for stopping a runaway animal.

As a means for raising the gate 15 to clear the highway for passage of teams and vehicles, to the opposite ends of the longitudinal frame 25 of the gate 15 are fastened the ends of cables or ropes 27 and 28 which are trained over pulleys 29 and 30 rotatable in brackets 31 and 32 held in the upper part of the pillars 12 and 13 respectively. The free ends of the cables 27 and 28 may be detachably held, for instance as shown to the pillar 12, in any suitable manner, and when it is desired to elevate the gate 15 by manually drawing said free ends downwardly the cables 27 and 28 and also the gate 15 will be directed upwardly to the required height.

A form of retaining means 33 to hold the gate 15 when elevated clear of the driveway 10 is provided by arranging a cross-rod 34 which is journaled in suitable bearings formed in the upper part of each of the pillars 12 and 13, and projecting from the cross-rod 34 are a plurality of hooks 35 adapted to grip the netting 15ª or frame 25 when the gate 15 is raised. In order to meet emergency cases, as is usual where animals run away, I provide releasing means 36 adapted when operated to readily release the gate 15 from the retaining means 33 so as to permit said gate to quickly fall to the surface of the driveway 10. For this purpose a depending arm 37 is held upon one end of the cross-rod 34 and is held against movement by a pin 38 slidably held in the pillar 12. Encircling the pin 38 is a spring 39 which normally forces said pin in a direction whereby the free end thereof will engage the depending arm 37 and hold the same from lateral movement when the gate 15 is in an elevated position. When it is desired to release said gate from the retaining means 33 the pin 38 is pushed inwardly against the tension of the spring 39 and the depending arm 37 will be free to swing laterally by which movement the grip-hooks 35 will move simultaneously therewith and the gate 15 will be released from said retaining means and automatically guided to be disposed across the surface of the driveway.

In Fig. 4 is shown a form of raising means for the gate 15 wherein the guides 17 are dispensed with and instead thereof a rod 40 is pivotally held at one end to each of the brackets 16 and to the opposite end of said rod is connected the upper frame 25 of the gate. By this arrangement when the gate 15 is raised by the cable 28 the rods 40 will swing upwardly and the gate attached thereto will be held suspended after the free ends of the cable 28 are tied to the pillar 12.

It is understood that changes may be made in the shape of the gate proper or in the forms and proportions of the various means for operating my invention without departing from the spirit and scope thereof, therefore I do not wish to be limited to the particular form of device as herein illustrated and set forth.

Having thus described my invention, I claim as new and desire to secure by Letters Patent:

1. The combination of an arch formed of two vertically disposed pillars and a cross-beam held upon the upper part of said pillars, a substantially rectangular gate of pliable material arranged in the space between the pillars, a frame held upon the upper edge of the gate, brackets provided upon the underside of the cross-beam, a plurality of guides connected to the brackets and disposed vertically downward, means connected to said frame of the gate and adapted to be moved slidably upon the guides, means arranged upon the pillars and adapted to raise the gate in guided movement to the upper part of the arch, and means adapted to permit the gate to be automatically lowered in the space of the arch for the purpose set forth.

2. The combination of an arch formed of two vertically disposed pillars and a cross-beam held upon the upper part of said pillars, a gate of proportionate size to occupy substantially the lower part of the space between the two pillars, said gate having a body of intertwined pliable material, a frame arranged longitudinally upon the upper edge of the gate, a plurality of brackets provided upon the underside of the cross-beam, a guide connected to each of the brackets and disposed vertically downward, a slide movable upon each of the guides, a rod held to each slide and connected to said frame of the gate, means arranged upon the upper part of the arch and adapted to raise the gate in guided movement to the upper part of said arch, retaining means adapted to hold the gate when raised, and means adapted to automatically release the gate from the retaining means for the purpose set forth.

3. In a gate for stopping runaway animals, an arch constructed across a driveway, and consisting of two pillars and a cross-beam, a gate of a proportionate size to occupy substantially the lower part of the space between the two pillars, said gate comprising a body of intertwined rope, a longitudinal frame arranged upon the upper edge of the body and a longitudinal frame provided upon the lower edge of said body, a plurality of angle-irons held to the underside of the cross-beam, a guide connected to each of angle-irons, each of said guides consisting of two parallel arranged arms disposed vertically downward, a slide consisting of two rings formed upon a bridge and movable upon each of the guides, a cable held to each of the bridges and connected to the upper frame of the gate, means arranged upon the upper part of the arch and adapted when manually operated to raise the gate in guided movement to the upper part of said arch, retaining means adapted to hold the gate when raised, and means adapted to automatically release the gate from the retaining means for the purpose set forth.

4. In a gate for stopping runaway animals, an arch constructed across a driveway, and consisting of two pillars and a cross-beam, a gate of netting and of a proportionate size to occupy substantially the lower part of the space between the two pillars, a plurality of brackets held to the underside of the cross-beam, a downwardly disposed guide connected to each of the brackets, means slidably held upon the brackets and adapted to hold the gate in a suspended position, means adapted to raise the gate, said means consisting of cables trained over pulleys held to the upper part of the archway, and having free ends by which the raising means may be manually operated, retaining means adapted to hold the gate when raised, said retaining means consisting of a cross-rod journaled in the upper part of the pillars, and a plurality of grip-hooks arranged upon the cross-rod, and means adapted to automatically release the gate from the retaining means for the purpose set forth.

5. A gate for stopping runaway animals, comprising an arch consisting of two vertically arranged pillars and a cross-beam, a gate of a proportionate size to occupy substantially the lower part of the space between the two pillars, said gate being formed of a body of intertwined pliable material, a frame arranged upon the upper edge of the body and a frame provided upon the lower edge of said body, a plurality of brackets held to the underside of the cross-beam, a guide connected to each of the brackets, each of said guides consisting of two parallel arranged arms disposed vertically downward, a slide consisting of two rings formed upon a bridge and movably held upon each of the guides, an arm held to each of the bridges and connected to the upper frame of the gate, means adapted to raise the gate, said means comprising cables trained over pulleys held to the upper part of the archway, and having free ends by which the raising means may be manually operated, retaining means adapted to hold the gate when raised, said retaining means consisting of a cross-rod journaled in the upper part of the pillars, and a plurality of grip-hooks arranged upon the cross-rod, and means adapted to release the gate from the retaining means, said releasing means including a depending arm held upon one end of the cross-rod, a pin slidably held in one of the pillars, a spring encircling the pin and normally forcing said pin outwardly, substantially as described and for the purpose set forth.

This specification signed and witnessed this first day of July A. D. 1910.

GEORGE W. BEAL.

Witnesses:
ROBT. B. ABBOTT,
S. SAHNER.

---

Copies of this patent may be obtained for five cents each, by addressing the " Commissioner of Patents, Washington, D. C."